W. A. REED.
BELT SHIFTER.
APPLICATION FILED FEB. 15, 1909.
1,028,966.
Patented June 11, 1912.
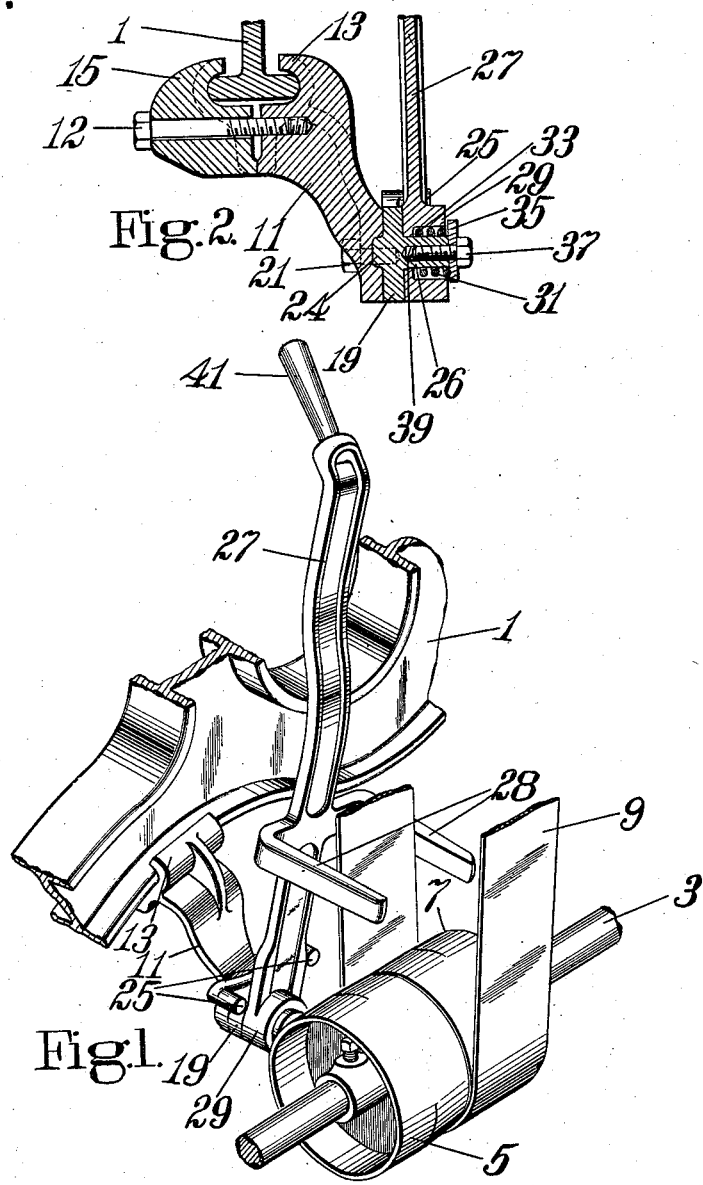
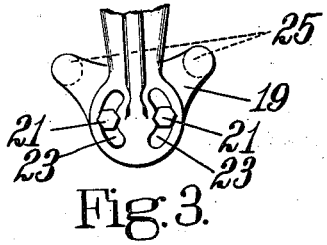
WITNESSES:
Elizabeth C. Coupe
Edith C. Holbrook
INVENTOR
William A. Reed
By his Attorney
Nelson W. Howard
COLUMBIA PLANOGRAPH CO., WASHINGTON, D. C.

UNITED STATES PATENT OFFICE.

WILLIAM A. REED, OF CHELSEA, MASSACHUSETTS, ASSIGNOR TO UNITED SHOE MACHINERY COMPANY, OF PATERSON, NEW JERSEY, A CORPORATION OF NEW JERSEY.

BELT-SHIFTER.

1,028,966.  Specification of Letters Patent.  Patented June 11, 1912.

Application filed February 15, 1909. Serial No. 477,958.

*To all whom it may concern:*

Be it known that I, WILLIAM A. REED, a citizen of the United States, residing at Chelsea, in the county of Suffolk and State of Massachusetts, have invented certain Improvements in Belt-Shifters, of which the following description, in connection with the accompanying drawings, is a specification, like reference characters on the drawings indicating like parts in the several figures.

This invention relates to a belt shifter and more particularly to a device of this class which may be readily attached to and detached from a conveniently located fixed member.

Ordinarily a belt shifter is provided with a bracket which is adapted to be permanently attached by bolts or screws to the ceiling or the floor or to some part of the machine to which power is being applied. If now for any reason the position of the belt is changed, it becomes necessary to prepare a new seat for the bracket of the belt shifter and often to make radical changes in said shifter itself in order to adapt it to its new position, this latter being particularly true where not only the position of the belt but the angle at which it is applied is changed.

One object of this invention, then, relates to the provision of a belt shifter having means for readily attaching it to and detaching it from a conveniently located fixed member and inasmuch as the location or contour of said fixed member may be such that although the belt shifter is thus brought into proximity with the belt its belt engaging member may not be properly placed, means is provided whereby the parts of the device may be adjusted, if necessary, so that the belt engaging member will be properly positioned with respect to said belt. These results may be accomplished by any suitable means, and in the illustrated embodiment there is shown a bracket provided with a clamp having jaws which are adapted to grip the frame of the machine to which the belt transmits power, while an adjustable support mounted on said bracket furnishes means for properly positioning the shifting member. Although the means for positioning the belt-engaging member is shown in connection with a bracket which is readily detachable from a fixed member it should be understood that said means may be used if desired in connection with any suitable bracket.

A belt shifter commonly comprises a shifting member which has two or more positions of rest, the number and location of these positions depending upon the number and location of the pulleys with which the belt governed by said shifter is arranged to engage. It often happens, however, that the vibration due to the motion of the machinery jars the shifting member and causes it to move from a position of rest and thereby shift the belt at a time when such shifting is not desired.

Another object of this invention, therefore, relates to provision for preventing such accidental and undesirable operation of the shifter. This may be conveniently accomplished by causing the shifting member to frictionally engage the support. In this connection it is desirable that the amount of friction be considerable and that it be capable of being regulated. Any convenient means for accomplishing these ends may be used; and in the illustrated embodiment a resilient member, the tension of which may be varied, presses the shifting member against the support.

These and other features of the invention including certain details of construction and combinations of parts will be explained in connection with the following description of a device and will be pointed out more definitely in the claims.

Referring now to the drawings,—Figure 1 is a perspective showing the belt shifter attached to the frame of a machine and in operative relation to the belt by which power is transmitted to said machine; Fig. 2 is a longitudinal section through the belt shifter and the fixed member (in this case the frame of the machine) to which it is attached, the upper parts of said fixed member and said shifter being broken away, and Fig. 3 is a detail rear elevation of the lower part of the belt shifter showing the means whereby the support may be adjusted.

In Fig. 1 is shown a portion of the frame 1 of a machine together with the counter-shaft 3 of said machine. A fast pulley 5 and a loose pulley 7 are mounted on said counter-shaft, their position longitudinally of said shaft depending upon the position of the pulley (not shown) from which power is taken. A belt 9 connects said power pulley with the fast or the loose pulley as desired. The frame and counter-shaft chosen for illustration are those of a Gilmore buffing machine, and in this particular machine the portion of the frame most conveniently located with respect to the belt has a curved lower outline as shown in Fig. 1. It is evident now that a belt shifter for use with this machine must be capable of ready attachment and detachment so as to be attached to the frame at a point opposite the pulleys, and because of the curved outline of the frame must also be capable of adjustment so as to properly position the belt engaging members of said shifter with respect to said belt. Accordingly, a bracket 11 provided with a clamp comprising two jaws 13 and 15, is adapted to be gripped by means of a screw bolt 12 to the fixed member, herein shown as a portion of the frame 1. If the outline of that portion of the frame which is engaged by the clamp were parallel to the counter-shaft 3 no further adjustment would be necessary, but inasmuch as said frame has a curved outline, a support 19 is pivotally mounted on said bracket and is adjustably attached thereto by screw bolts 21 which extend through segmental slots 23 in said bracket 11 and are threaded into said support 19, it being evident that by loosening said screw bolts said support may be adjusted with respect to said bracket. The support 19 is provided with a cylindrical projection or pivot 24 which enters a socket in the bracket 11. Said support is also provided with an oppositely extending bearing 26 and with two stops or lugs 25. A shifting or belt-engaging member 27 having belt engaging fingers 28 is rotatably mounted on said bearing and extends between said stops. In order to cause said shifting member and said support to frictionally engage each other in such a manner that the amount of friction may be varied the hub 29 of said member is counter bored and a spring 31 encircles the bearing 26. The inner end of said spring engages the shoulder 33 formed by the counter bore, while the outer end is engaged by a washer 35 which is loosely mounted on a screw bolt 37 threaded into a socket 39 in the bearing 26 of the support 19. By advancing the bolt the tension of the spring and thereby the friction between the support and the shifting member may be increased. Although a separate spring has been shown it should be understood that any suitable means for producing friction may be used if desired and that it is not essential that a separate means be provided since it is evident, for example, that the member 27 might itself be resilient and thereby adapted to press against its support.

The operation of the device is as follows:—The screw bolt 37 is first adjusted until the spring has the desired tension; and in this connection it should be noted that bolt 37 and the washer 35 may be regarded if desired as parts of the support 19. The bracket 11 is then clamped to any suitable fixed member which is conveniently located with respect to the belt. The bolts 21 are loosened, if necessary, and the support 19 adjusted until the stops and with them the shifting member are properly positioned, the fingers 27 of said member engaging the belt as shown in Fig. 1. The operator then by means of the handle 41 may rotate the lever from one stop to the other about the bearing 26 as a pivot, such rotation being continually opposed by the spring 31 which presses the shifting member against the support and tends to hold it in any position in which it may be placed.

The bracket has been shown and described as of a particular form and the support as adjustable in a single plane but it should be understood that this has been done merely because the belt shifter has been described for convenience in connection with a particular machine. And although this invention has been shown and described as adapted for use with a particular machine it should be understood that the device may obviously be adapted for use with other machines and that any suitable fixed member other than a part of the frame of the machine may serve as a fixture to which to attach the bracket.

Having described the invention, what I claim as new and desire to secure by Letters Patent of the United States is:—

1. A belt shifter having in combination a bracket provided with a clamp, a support adjustably mounted thereon, a shifting member mounted on said support, and yielding means acting to oppose relative motion between said support and said member.

2. A belt shifter having in combination a support provided with stops, a shifting lever movable in a path limited by said stops and means whereby said support may be angularly adjusted to vary the extreme positions of the lever.

3. A belt shifter having in combination a support provided with stops, a shifting lever movable in a path limited by said stops, and means whereby said support may be angularly adjusted in a path at an angle to the axes of said stops.

4. A device for shifting a belt having in combination a support, a shifting lever rotatable upon said support, and means whereby said support and with it said lever may be angularly adjusted in a plane approximately parallel with that of the face of the belt.

5. A belt shifter having in combination a bracket adapted to be clamped to any convenient fixed base, a support carried by said bracket, a shifting member carried by said support and movable with respect thereto, said support being angularly adjustable with respect to said bracket, and means for holding said support in adjusted position.

6. A belt shifter having in combination a support provided with a bearing and with stops, a lever provided with belt engaging fingers, said lever being rotatably mounted on said bearing and extending between said stops, and means whereby said support may be angularly adjusted in a direction substantially parallel to the operative surface of the belt.

7. A belt shifter having in combination, a bracket, a support pivotally mounted on said bracket, said support being provided with a bearing and with stops, a lever provided with belt engaging fingers, said lever being rotatably mounted on said bearing and extending between said stops, and means whereby said support may be angularly adjusted on said bracket in a direction substantially parallel to the operative surface of the belt.

8. A belt shifter for use with a belt driven machine having in combination a bracket adapted to be clamped to the frame of said machine, a support, a shifting member, and means whereby said support may be angularly adjusted in a direction substantially parallel to the operative surface of the belt to bring said shifting member into operative relation with said belt.

9. A belt shifter having, in combination, a support, a shifting lever, one of said members being provided with stops for limiting the extent of movement of said lever, and means whereby said support may be angularly adjusted in a path the plane of which is parallel to the plane of the path of said lever.

10. A belt shifter having, in combination, a support provided with stops, a shifting lever movable in a path limited by said stops, and means whereby said support may be angularly adjusted in a path the plane of which is parallel to the plane of the path of said lever.

11. A belt shifter for use with a belt-driven machine having, in combination, a bracket having provision for clamping it to the frame of the machine whereby said bracket may occupy different angular positions, a support carried by said bracket, said support being adjustable to compensate for the angular position of the bracket, and a shifter member movable upon said support to shift the belt.

12. A belt shifter for use with a belt-driven machine having, in combination, a bracket having provision for clamping it to the frame of the machine whereby said bracket may occupy different angular positions, a support carried by said bracket, said support being adjustable to compensate for the angular position of the bracket and being formed with a bearing, a shifter member engaging said bearing, and a spring for holding said shifter member against said support.

In testimony whereof I have signed my name to this specification in the presence of two subscribing witnesses.

WILLIAM A. REED.

Witnesses:
 CHESTER EUGENE ROGERS,
 BURTON N. CLARY.

---

Copies of this patent may be obtained for five cents each, by addressing the "Commissioner of Patents, Washington, D. C."